(12) United States Patent
Boehm et al.

(10) Patent No.: US 6,648,776 B1
(45) Date of Patent: *Nov. 18, 2003

(54) MULTILAYER GOLF BALL WITH A THIN THERMOSET OUTER LAYER

(75) Inventors: Herbert C. Boehm, Norwell, MA (US); William E. Morgan, Barrington, RI (US); Christopher Cavallaro, Lakeville, MA (US); Jeffrey L. Dalton, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 34 days.

This patent is subject to a terminal disclaimer.

(21) Appl. No.: 09/598,998

(22) Filed: Jun. 22, 2000

Related U.S. Application Data (60) Continuation-in-part of application No. 09/005,906, filed on Jan. 12, 1998, now Pat. No. 6,103,166, and a continuation-in-part of application No. 09/324,850, filed on Jun. 3, 1999, now abandoned, which is a division of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.$^7$ .............................................. A63B 37/06
(52) U.S. Cl. ....................................... 473/374; 264/250
(58) Field of Search ................................ 473/373, 374, 473/377; 264/250, 274, 275

(56) References Cited

U.S. PATENT DOCUMENTS

| | | | |
|---|---|---|---|
| 697,925 A | 4/1902 | Kempshall | |
| 700,658 A | 5/1902 | Kempshall | 473/374 |
| 704,748 A | 7/1902 | Kempshall | 473/374 |
| 720,852 A | * 2/1903 | Smith | 473/374 |
| 1,558,706 A | 10/1925 | Mitzel | |
| 2,229,170 A | 1/1941 | Greene | 273/62 |
| 2,376,085 A | 5/1945 | Radford et al. | 18/30 |
| 3,147,324 A | 9/1964 | Ward | 264/254 |
| 3,177,280 A | 4/1965 | Ford et al. | 264/275 |
| 3,262,272 A | 7/1966 | Barakauskas et al. | 60/39.05 |
| 3,616,101 A | 10/1971 | Satchell et al. | 161/7 |
| 3,989,568 A | 11/1976 | Isaac | 156/182 |
| 4,173,345 A | 11/1979 | Pocklington | 273/217 |
| 4,203,941 A | 5/1980 | Brooker | 264/250 |

(List continued on next page.)

FOREIGN PATENT DOCUMENTS

| | | |
|---|---|---|
| GB | 2278609 | 7/1994 |
| GB | 2291811 | 7/1996 |
| GB | 2291812 | 7/1996 |
| GB | 2291817 | 7/1996 |

*Primary Examiner*—Steven Wong
*Assistant Examiner*—Raeann Gorden
(74) *Attorney, Agent, or Firm*—Swidler Berlin Shereff Friedman, LLP (57) ABSTRACT

The present invention is directed towards a multilayer golf ball which comprises a core, an inner cover layer and an outer cover layer, wherein the outer cover layer comprises a castable reactive liquid material having a shore D hardness less than the shore D hardness of the material forming the inner cover layer. The present invention also relates to golf balls having improved adhesion between adjacent layers, as well as method for making golf balls having such improved adhesion. In particular, the outer surface of the core, an intermediate layer(s) or both the core and the intermediate layer(s) has a textured surface profile integrally molded in the outer surface thereof so that the surface profile promotes interfacial adhesion.

23 Claims, 7 Drawing Sheets

U.S. PATENT DOCUMENTS

| | | | |
|---|---|---|---|
| 4,229,401 A | 10/1980 | Pocklington | 264/248 |
| 4,267,217 A * | 5/1981 | Brooker | 428/11 |
| 4,367,873 A | 1/1983 | Chang et al. | 273/60 R |
| 4,431,193 A | 2/1984 | Nesbitt | 273/235 R |
| 4,625,964 A | 12/1986 | Yamada | 273/62 |
| 4,714,253 A | 12/1987 | Nakahara et al. | 273/228 |
| 4,848,770 A | 7/1989 | Shama | 273/228 |
| 4,919,434 A | 4/1990 | Saito | 273/235 R |
| 4,959,000 A | 9/1990 | Giza | 425/116 |
| 5,002,281 A | 3/1991 | Nakahara et al. | 273/220 |
| 5,006,288 A | 4/1991 | Rhodes et al. | 264/46.6 |
| 5,006,297 A | 4/1991 | Brown et al. | 264/234 |
| 5,072,944 A | 12/1991 | Nakahara et al. | 273/220 |
| 5,112,556 A | 5/1992 | Miller | 264/279 |
| 5,253,871 A | 10/1993 | Viollaz | 273/228 |
| 5,314,187 A | 5/1994 | Proudfit | 273/235 R |
| 5,334,673 A | 8/1994 | Wu | 273/235 R |
| 5,415,937 A | 5/1995 | Cadorniga et al. | 473/385 X |
| 5,553,852 A | 9/1996 | Higuchi et al. | 473/373 |
| 5,574,107 A | 11/1996 | Hiraoka et al. | 473/378 |
| 5,586,950 A | 12/1996 | Endo | 473/378 |
| 5,609,535 A | 3/1997 | Morgan | 473/378 X |
| 5,663,235 A | 9/1997 | Tanaka | 525/201 |
| 5,668,191 A | 9/1997 | Kinkelaar et al. | 521/174 |
| 5,688,191 A | 11/1997 | Cavallaro | 473/373 |
| 5,692,973 A | 12/1997 | Dalton | 473/374 |
| 5,692,974 A | 12/1997 | Wu et al. | 473/377 |
| 5,704,852 A | 1/1998 | Kato et al. | 473/357 |
| 5,733,428 A | 3/1998 | Calabria et al. | 264/134 |
| 5,759,676 A | 6/1998 | Cavallaro | 428/215 |
| 5,776,013 A | 7/1998 | Yokota | 473/377 |
| 5,779,561 A | 7/1998 | Sullivan | 473/373 |
| 5,779,562 A | 7/1998 | Melvin | 473/373 |
| 5,803,831 A | 9/1998 | Sullivan et al. | 473/374 |
| 5,810,678 A | 9/1998 | Cavallaro | 473/373 |
| 5,813,923 A | 9/1998 | Cavallaro | 473/373 |
| 5,820,485 A * | 10/1998 | Hwang | 473/361 |
| 5,836,834 A | 11/1998 | Masutani et al. | 473/374 |
| 5,885,172 A | 3/1999 | Hebert et al. | 473/354 |
| 5,899,822 A | 5/1999 | Yamagishi et al. | 473/374 |
| 5,984,807 A | 11/1999 | Wai et al. | 473/376 |
| 6,057,403 A | 5/2000 | Sullivan et al. | 525/221 |
| 6,103,166 A * | 8/2000 | Boehm et al. | 264/250 |

* cited by examiner

MULTILAYER GOLF BALL WITH A THIN THERMOSET OUTER LAYER

This is a continuation-in-part of U.S. application Ser. No. 09/005,906, filed Jan. 12, 1998 now U.S. Pat. No. 6,103,106, for Method and Apparatus for Improving Adhesion between Golf Ball Layers and a continuation-in-part of U.S. application Ser. No. 09/324,850 now abandoned, filed Jun. 3, 1999 for Multilayer Golf Ball with a Thin Thermoset Outer Layer, which is a divisional of U.S. application Ser. No. 09/207,690 now U.S. Pat. No. 6,132,324, filed Dec. 9, 1998 for Method for Forming a Multilayer Golf Ball with Thin Thermoset Outer Layer, which is a divisional of U.S. application Ser. No. 08/863,788, filed May 27, 1997, for Multilayer Golf Ball with a Thin Thermoset Outer Layer, which issued as U.S. Pat. No. 5,885,172.

FIELD OF INVENTION

This invention relates generally to golf balls, and more specifically, to a multilayer golf ball having improved adhesion between adjacent component layers as well as method for forming such golf balls. In particular, this invention relates to a golf ball having a core, an inner cover layer and a very thin outer cover layer, wherein the outer cover layer comprises a thermoset material formed from a castable, reactive liquid and the inner cover layer comprises a high flexural modulus material with a textured pattern to improve adhesion between the layers.

BACKGROUND OF THE INVENTION

Conventional golf balls can be divided into three general types or groups: (1) two piece balls, (2) wound balls (also know as three piece balls), and (3) multilayer balls. The difference in play characteristics resulting from these different types of constructions can be quite significant.

Balls having a two piece construction are generally most popular with the recreational golfer because they provide a very durable ball while also providing maximum distance. Two piece balls are made with a single solid core, usually formed of a crosslinked rubber, which is encased by a cover material. Typically the solid core is made of polybutadiene which is chemically crosslinked with zinc diacrylate and/or similar crosslinking agents. The cover comprises tough, cut-proof blends of one or more materials known as ionomers such as SURLYNs®, which are resins sold commercially by DuPont or Iotek® which is sold commercially by Exxon.

The combination of the above-described core and cover materials provides a "hard" covered ball that is resistant to cutting and other damage caused by striking the ball with a golf club. Further, such a combination imparts a high initial velocity to the ball which results in increased distance. Due to their hardness however, these balls have a relatively low spin rate which makes them difficult to control, particularly on shorter approach shots. As such, these types of balls are generally considered to be "distance" balls. Because these materials are very rigid, many two piece balls have a hard "feel" when struck with a club. Softer cover materials such as balata and softer ionomers in some instances, have been employed in two piece construction balls in order to provide improved "feel" and increased spin rates.

Wound balls typically have either a solid rubber or liquid filled center around which many yards of a stretched elastic thread or yarn are wound to form a core. The wound core is then covered with a durable cover material such as a SURLYN® or similar material or a softer cover such as balata or polyurethane. Wound balls are generally softer than two piece balls and provide more spin, which enables a skilled golfer to have more control over the ball's flight and final position. In particular, it is desirable that a golfer be able to impart back spin to a golf ball for purposes of controlling its flight and controlling the action of the ball upon landing on the ground. For example, substantial back spin will make the ball stop once it strikes the landing surface instead of bounding forward. The ability to impart back spin onto a golf ball is related to the extent to which the golf ball cover deforms when it is struck with a golf club. Because wound balls are traditionally more deformable than conventional two piece balls, it is easier to impart spin to wound balls. However, wound higher spinning balls typically travel a shorter distance when struck as compared to a two piece ball. Moreover, as a result of their more complex structure, wound balls generally require a longer time to manufacture and are more expensive to produce than a two piece ball.

The United States Golf Association (USGA) has instituted a rule that prohibits the competitive use in any USGA sanctioned event of a golf ball that can achieve an initial velocity of greater than 76.2 meters per second (m/s), or 250 ft/s, when struck by a driver with a velocity of 39.6 m/s, i.e., 130 ft/s (referred to hereinafter as "the USGA test"). However, an allowed tolerance of two percent permits manufacturers to produce golf balls that achieve an initial velocity of 77.7 m/s (255 ft/s).

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

Therefore, golf ball manufacturers are continually searching for new ways in which to provide golf balls that deliver the maximum performance in terms of both distance and spin rate for golfers of all skill levels.

Relatively recently, a number of golf ball manufacturers have introduced multilayer golf balls, i.e., having multiple core intermediate mantle and/or cover layers, in an effort to overcome some of the undesirable aspects of conventional two piece balls, such as their hard feel, while maintaining the positive attributes of these golf balls (including their increased initial velocity and distance). Further, it is desirable that such multilayer balls have a "click and feel" as well as spin characteristics approaching that of wound balls.

Multilayer golf balls can be formed using a variety of constructions. For example, multilayer balls may have two or more cover layers molded around a conventional core with one or more intermediate layers interposed between the cover and the core. Likewise, multilayer balls may be formed from cores having more than one core layer and may optionally contain one or more intermediate and/or cover layers. Multilayer balls may even comprise a conventional wound core around which at least one intermediate layer and/or at least one cover layer is formed. Examples of multilayer balls include the Altus Newing (Bridgestone), Reygrande 2×2 (Bridgestone), Giga (Spalding) Metal Mix (Dunlop), Ultra Tour Balata (Wilson).

Typically, the layers of multilayer golf balls are formed by molding them around the core or a preceding intermediate layer or cover layer. Conventional techniques for applying such layers include injection molding, compression molding and casting the layer material around the preceding core or layer. Accordingly, a crucial aspect of the manufacture of multilayer balls is obtaining good adhesion between the various layers. If the adhesion between the layers does not meet desired standards, the performance or durability of the golf ball will be adversely affected. For example, poor adhesion can cause air pockets between the layers which can result in separation of the layers when the ball is struck with a club.

It is well known that the adhesion between the wound core and the cover of a wound ball is enhanced due to the small imperfections created in the uneven outer surface of the winding formed by overlapping the thread. Cover material flows into these imperfections when the cover is molded about the wound core, resulting in improved adhesion. In contrast, however, in two piece and multilayer balls, adhesion between the core, cover and/or intermediate layers is greatly reduced due to the relatively smooth outer surface of the layers.

Accordingly, there are a number of methods known in the art directed towards promoting adhesion between the various solid layers of a golf ball. For example, U.S. Pat. Nos. 4,229,401 and 4,173,345 are directed towards alleviating problems associated with compression molding covers about a core by providing a series of surface channels $\frac{1}{16}$ of an inch deep which encircle the outer surface of the core and pass through both polar areas thereof. Providing such channels was found to prevent separation of the cover from the core when the ball is struck with a golf club by eliminating the entrapment of air between the cover and the core during the compression molding process.

Additionally, there are a number of patents directed towards promoting adhesion between core layers and covers, as well as adhesion between intermediate layers, including wound layers, through the use of projections or prongs extending from the outer surface of the core or an intermediate layer. For example, U.S. Pat. Nos. 721,852 and 2,229,170 disclose the use of a plurality of uniform sized projections extending from the surface of the core. Such projections are designed to provide an anchoring means for an elastic thread winding.

Moreover, U.S. Pat. No. 697,925 discloses game balls wherein a metallic core is covered by a soft rubber envelope which contains a plurality of deep "pits" extending about halfway through the envelope. A hard shell material is compression molded around the core/envelope such that the shell material flows into the pits, thereby forming prongs which interlock the hard shell with the soft rubber envelope.

Additionally, it is known in the golf ball art that adhesion between the cover and the core of a two-piece golf ball can be improved by roughening the outer surface of the core layer. For example, U.S. Pat. No. 1,558,706 provides a very general disclosure of improving the adhesion of a two piece ball having a vulcanized rubber core and a balata shell, wherein the outer surface of the core is roughened by forming corrugations which assist in interlocking the cover and the core so as to prevent any movement therebetween when the ball is struck with a club. Although the '706 patent discloses the general concept of roughening the core surface to improve adhesion, it does not provide any details as to how the core surface is roughened nor any specifics regarding the characteristics of the corrugations in the core surface.

Similarly, U.S. Pat. No. 4,367,873 discloses making a softball or a baseball having a PVC foam core and an ethylene copolymer core cover, wherein the core cover has corrugations one eighth to one sixteenth of an inch high. A layer of yarn windings is wound around the core cover and a leather outer cover is then placed around the windings. The '873 patent discloses that such corrugations may have a buffering effect when the ball is impacted and provide a more resilient ball as well as possibly increasing the binding friction between the outer leather cover and the inner core.

One conventional method for improving the adhesion between the layers of a multilayer golf ball is to texture the outer surface of, e.g., a core or a core with an intermediate layer(s) molded around it by manually roughening or scuffing the outer surface after molding and prior to forming the subsequent layer thereon. Such surface roughening is typically obtained by grinding the surface with a grinder such as a Glebar grinder or by tumbling or milling the ball at various stages of its construction in an abrasive media. Likewise, the surface may be roughened by blasting the surface of the layer with sand or some other abrasive material.

After the surface is roughened, it must be washed to remove any loose material or excess abrasive material. Otherwise, the loose material and/or excess abrasive material which remains on the surface will form air pockets when the next layer is molded thereon. As mentioned above, such air pockets are undesirable as they lead to separation of the layers. Further, the roughened surface must be completely dried before the next layer can be applied. If it is not dried completely, the remaining moisture is converted into steam when the next layer is molded around it, forming defects in the interfacial bonding area that can also lead to separation of the layers.

Although such post-molding methods roughen the outer surface of the layer, it is difficult to obtain sufficient texture depths with these processes. Moreover, even after washing and drying the treated surface, there is a tendency for small particles from the golf ball layers and/or excess abrasive media to remain in the interfacial bonding area between the layers which are easily dislodged when the ball is struck with a club and can form air pockets between the layers which can lead to the separation of the layers. Similarly, inadequate texture depth can also lead to separation of the layers.

Further, such post-molding roughening methods require, at a minimum, three distinct steps: (1) roughening the surface via grinding; (2) washing the roughened surface to remove excess debris; and (3) thoroughly drying the roughened surface before the next layer can be applied. Each of these process steps are labor intensive, time-consuming and add additional expense to the production of multilayer golf balls.

Thus, there remains a need for an efficient method for improving the interfacial adhesion between golf ball layers, wherein the outer surface of a layer is provided with a texture of an adequate depth and free of debris, while eliminating any post-molding treatments such as grinding, sandblasting, washing and drying.

Additionally, a number of patents have been issued directed towards modifying the properties of a conventional two piece ball by altering the typical single layer core and/or single cover layer construction to provide a multilayer core and/or cover. The inventions disclosed in these patents are directed towards improving a variety of golf ball characteristics.

For example, there are a number of multilayer ball patents directed towards improving the spin, click or feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. This patent teaches that it is desirable that the center core is softer than the outer layer, wherein the layers have a hardness (Shore C) of 25–50 and 70–90 respectively.

U.S. Pat. No. 4,625,964 relates to a solid golf ball having a polybutadiene rubber core of a diameter not more than 32 mm, and a polybutadiene rubber intermediate layer having a specific gravity lower than that of the core material.

U.S. Pat. No. 4,848,770 discloses a non-wound three-piece golf ball which includes a core of a highly filled synthetic rubber or polymeric material, an intermediate mantle of an unfilled synthetic rubber and a cover. The core and intermediate mantle have a hardness between 50–95.

U.S. Pat. No. 5,002,281 is directed towards a three-piece solid golf ball which has an inner core having a hardness of 25–70 (Shore C) and an outer shell having a hardness of 80–95 (Shore C), wherein the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

Several additional patents are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, wherein either or both layers may comprise a foamed ionomer resin.

U.S. Pat. No. 5,314,187 also relates to golf balls having a cover formed with multiple layers, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise materials that are capable of fusion bonding with each other.

UK Patent Application Nos. GB 2,291,817 and 2,291,812 are both directed towards a wound golf ball with improved distance comprising a dual cover layer, wherein the inner cover layer has a high hardness as compared to the outer cover layer. These references teach that the cover layers may be formed from balata or ionomer resins and should have a combined thickness of less than 4 mm.

UK Patent Application No. GB 2,278,609 discloses a multilayer golf ball providing enhanced distance without sacrificing playability or durability comprising a core, an inner cover layer and an outer cover layer wherein the inner cover layer comprises a high acid ionomer and the outer cover layer comprises a soft ionomer or a non-ionomeric thermoplastic elastomer.

However, none of these patents disclose a multilayer ball having a very thin thermoset outer layer formed from a castable reactive liquid as disclosed herein to provide golf balls exhibiting a "progressive performance" such as those golf balls of the present invention.

SUMMARY OF THE INVENTION

The present invention is directed towards a multilayer golf ball having improved adhesion between adjacent component layers as well as methods for forming such golf balls. The cover of such golf balls are comprised of an inner layer and a cast outer layer.

The present invention is further directed towards a multilayer golf ball which in general comprises a core, an inner cover layer and a very thin (i.e., <0.05") outer cover layer, wherein the inner cover layer comprises a high flexural modulus material and the outer cover layer comprises a thermoset material which is formed from a castable reactive liquid material.

In one particular embodiment, the present invention is directed towards a multilayer golf ball which comprises a core, an inner cover layer and a very thin outer cover layer, wherein: a) the core comprises a solid or liquid filled center around which a length of elastic thread is wound; b) the inner cover layer comprises a high flexural modulus material; and c) the outer cover layer comprises a thermoset material which is formed from a castable reactive liquid.

The present invention also is directed towards a method for improving the interfacial adhesion between the layers of golf balls, and multilayer golf balls in particular, as well as golf balls made from such methods.

In particular, the present invention is directed to a golf ball having improved interfacial adhesion between the layers forming the ball, wherein the ball comprises at least a cover and a core. The ball comprises a textured pattern on the exterior surface of the core, said pattern comprising a plurality of peaks having a height of about 2 to 15 mils and a draft angle of less than about 10 degrees. A cover material covers the textured core to form a two-piece ball.

In an alternate embodiment, the present invention further includes a golf ball comprised of one of more layers for the cover, wherein the inner layer(s) has a textured surface profile integrally formed in its outermost surface. The inner layer is formed by placing a core into a mold cavity, wherein the cavity has a textured pattern on the interior surface thereof. The pattern comprises a plurality of depressions having a depth of about 2 to 15 mils and a draft angle of less than about 10 degrees. The inner layer is preferably injection molded or compression molded such that an inner layer is formed with a textured surface profile on its outermost surface which is a corresponding image of the pattern of the mold cavity and comprises a plurality of peaks having heights of about 2 to about 15 mils. An outer cover material is subsequently cast over the textured intermediate layer.

The present invention is also directed to a golf ball having at least a cover, a core and optionally one or more intermediate layers disposed between the cover and the core, wherein the core and/or at least one intermediate layer has a textured surface profile integrally formed on its outermost surface. The textured surface profile comprises a plurality of peaks having heights of about 2 to about 15 mils. The textured surface profile may be a repeating pattern or it may be a random pattern of peaks. Such patterns may have peaks of a regular geometric shape or an irregular shape. The outer cover layer is cast over the core or intermediate layer and has a thickness of less than about 0.05 inches.

Additionally, the present invention is further directed towards a mold for forming a golf ball wherein the mold comprises a cavity having a textured pattern on the interior surface thereof, said textured surface comprising a plurality of depressions having depths of about 2 mils to about 15 mils and preferably a draft angle of less than about 10 degrees.

DETAILED DESCRIPTION OF THE INVENTION

By the present invention, it has been discovered that a golf ball of the presently claimed construction has a "progressive performance" when struck with a variety of clubs. More specifically, as used herein, the term "progressive performance" means that the presently claimed golf ball has the distance benefits of a traditional hard covered two piece ball when struck with a club having a high club head speed and a low loft angle, but also the high spin and feel characteristics similar to that of a traditional soft covered wound ball when struck with a club having a low head speed and high loft angle. Thus, golf balls of the presently claimed construction provide the "best of both worlds" in the golf ball art, i.e., a maximum distance ball with low spin for long shots (e.g., with a driver) but high spin and controllability for short shots (e.g., with a wedge). The present invention also is directed toward a method and apparatus for forming golf balls having improved interfacial adhesion between their layers, as well as to golf balls made according to such methods.

The methods of the present invention provide a streamlined, more efficient method for improving such interfacial adhesion as compared to presently known methods. More specifically, as discussed above, the prior art discloses several complicated methods for promoting adhesion of the various layers of a golf ball. Such method includes forming channels (1/16th of an inch or deeper) in the outer surface of an interior layer, forming deep pits extending halfway through the interior layer or forming an intricate series of protrusions in order to anchor subsequent layers to the interior layer. Additionally, it is also known to roughen the surface of a golf ball core or interior layer by fringing or exposing its surface to an abrasive media. However, all of these methods required a number of labor intensive and time consuming steps and/or provide inferior adhesion as compared to the golf balls of the present invention.

The golf balls of the present invention comprise a multilayer cover and a core, and optionally at least one intermediate layer (e.g., a mantle layer, inner cover layer or outer core layer) interposed between the outer cover layer and the core, wherein the outer surface of either the core, the intermediate layer(s) or both, has a textured surface profile integrally formed thereon. When a golf ball of the present invention comprises more than one layer having a textured surface profile (e.g., a textured core and a textured intermediate layer), the surface profiles may comprise the same or different patterns.

The textured surface profiles employed in the present invention comprise a plurality of peaks integrally molded in the outermost surface of the core, the intermediate layer(s) or both. As used herein, the term "peaks" refers to the raised areas extending from the surface of the core and/or intermediate layer(s). Several parameters must be considered in selecting the appropriate surface profile to be formed on the outer surface of a golf ball layer. These parameters include peak height, peak shape and pattern density. It is preferable that these parameters be selected to maximize the surface area available for interfacial bonding between the textured surface profile and the layer subsequently applied.

The peaks of the textured surface profile have a height of about 2 to about 15 mils, preferably about 2 to about 10 mils, more preferably about 3 to about 7 mils and most preferably about 4 to 5 mils. If all of the peaks have a height of less than 2 mils, it has been found that the adhesion between the layers is not appreciably enhanced. Likewise, it has been found that if the height of the depressions are greater than 15 mils, it is very difficult to remove the core or intermediate layer from the mold cavity.

The peaks may have the same height, or alternatively, a plurality of the peaks may have a height that is less than the peak with the maximum height. Further, the peaks may comprise a regular shape that extends to a single point such as a pyramid or a cone. Alternatively, the peaks may have an irregular or jagged shape which provides additional surface area for interfacial bonding with the subsequent layer. The peaks which form the surface profiles may also be substantially the same width or may comprise a wide range of widths.

As used herein, "peak density" refers to the percentage (%) of the surface area of the outer surface of the layer which is covered by the peaks of the surface profile as shown in FIGS. 1A–1E and 2A–2D. For optimal results, it is preferred that the peak density be about 45 percent to about 75 percent, more preferably about 50 percent to about 70 percent and most preferably about 60 percent of the surface area of outer surface.

As illustrated in FIGS. 1A–1E and 2A–2D, the surface profiles employed in the present invention may comprise a wide variety of random or repeating patterns of peaks having various shapes and/or heights. For example, as illustrated in FIGS. 2A–2D, the textured surface profile may, in an alternative embodiment comprise a repeating pattern of peaks having an irregular shape. Still further, as illustrated in FIGS. 1A–1E, the textured surface profile may comprise a random pattern of non-uniformly shaped peaks.

Many of the textured surface profiles suitable for use in the present invention have previously been used in alternative (i.e., non-golf ball) applications as a decorative ornamental surface finish for a wide variety of plastic and metal commercial products such as housings for computers, photocopiers and electronic equipment, a variety of furniture, and various office products and accessories, to name but a few applications. However, in accordance with the present invention, it has now surprisingly been found that integrally molding such textured surface profiles on the outermost surface of cores and/or intermediate layer(s) of golf balls provides enhanced interfacial adhesion between the textured surface and the layer subsequently formed thereupon.

Since the textured patterns on the interior surface of the mold cavity correspond to the textured surface profiles to be integrally molded on the outer surface of an internal golf ball component, the desired features such as peak height, shape, and pattern density of the peaks of the surface profile must necessarily be considered when selecting a corresponding textured pattern for the interior surface of the mold.

Furthermore, an additional parameter to be considered in selecting a pattern for the surface of the mold cavity is the draft angle of the depression formed in the mold. The term "draft angle" is well known in the molding art. It measures the angle at which the side wall of a depression varies from the perpendicular. If the draft angle is too small, the molded piece will not readily release from the mold. However, in the present invention, if the draft angle is too large, the resulting peaks formed in the surface of the golf ball layer will not provide sufficient interfacial adhesion.

Thus, in order to obtain sufficient interfacial adhesion as well as adequate release from the mold cavity, the draft angle of the depressions of the patterns formed in the mold must be less than about 10 degrees, preferably about 2 degrees to about 10 degrees, more preferably about 4 degrees to about 8 degrees and most preferably about 6.5 degrees.

The textured surface profile is formed on the outer surface of the core and/or intermediate layer by integrally molding such a profile into the outer surface during the molding process used in forming the core and/or intermediate layer.

Figure 1A:
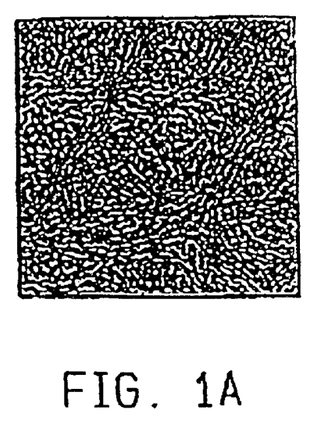
FIGS. 1A–1E illustrate several non-limiting examples of random textured surface proiles which are suitable for use in the present invention.
Figure 1B:
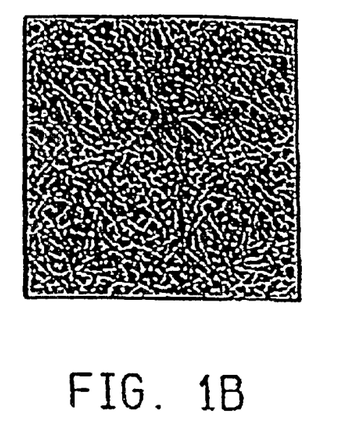
Figure 1C:
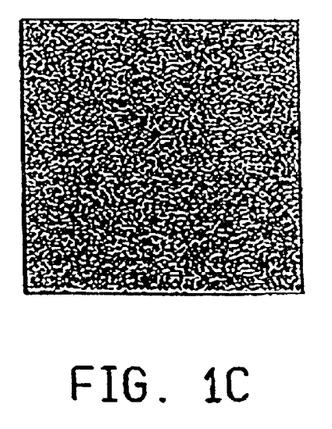
Figure 1D:
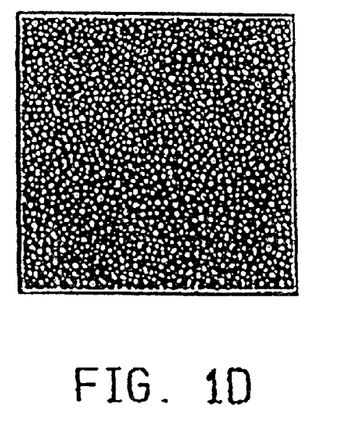
Figure 1E:
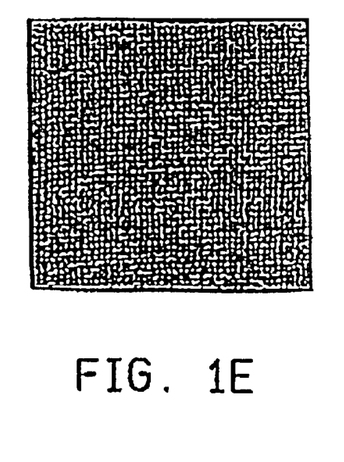
Figure 2A:
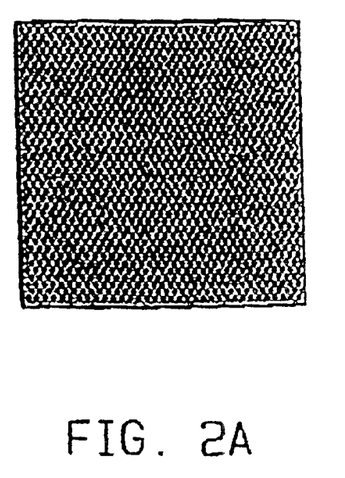
FIGS. 2A–2D illustrate non-limiting examples of uniform textured surface profiles which are suitable for use in the present invention.
Figure 2B:
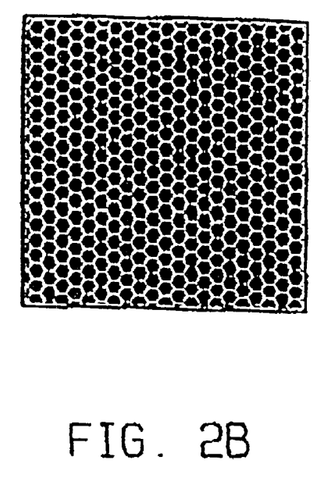
Figure 2C:
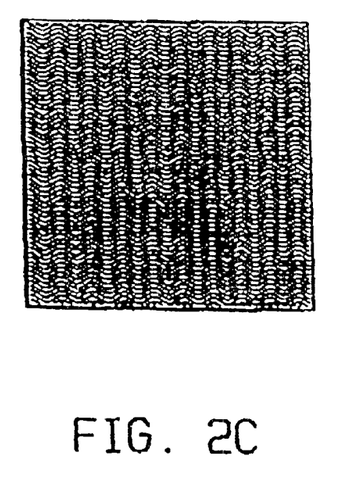
Figure 2D:
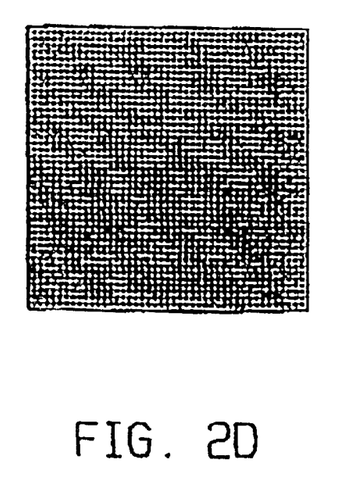
Figure 3A:
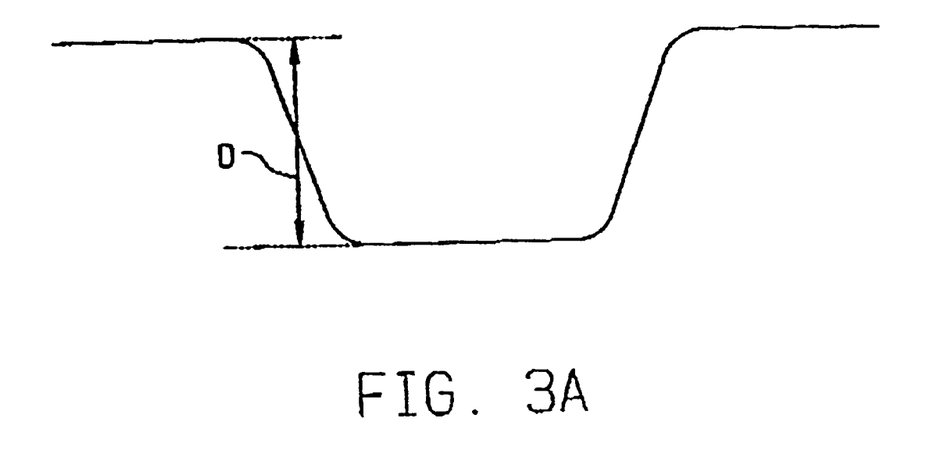
FIGS. 3A and 3B provide enlarged views of a single depression of the textured mold cavity patterns employed in the present invention.
Figure 3B:
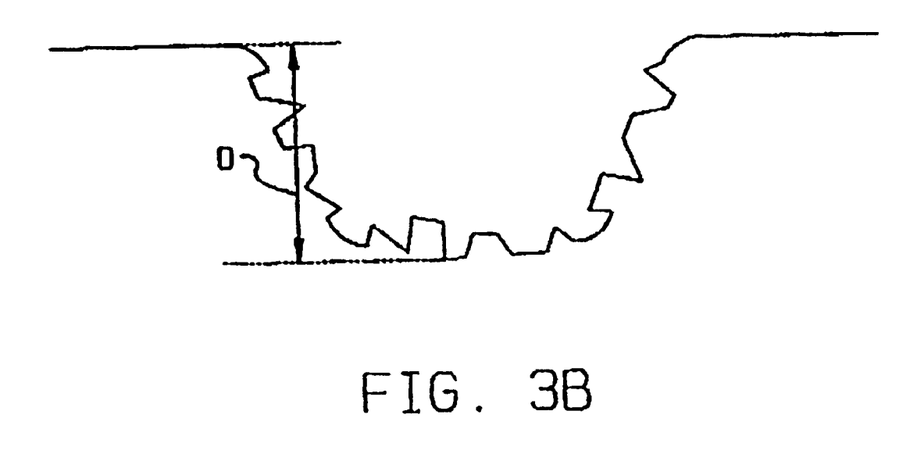

The textured surface profile is formed on the outer surface of the core and/or intermediate layer using a modified mold cavity. Typically, prior art mold cavities employed to form core layers and/or intermediate layers have a substantially smooth interior surface in order to facilitate the release of molded material from the cavity. However, the interior surface of the mold cavity used in the present invention, is adapted so as to have a textured pattern on its surface to produce a corresponding textured surface profile on the outer surface of the layered constructions formed therein. As illustrated in FIGS. 3A and 3B, the depression of the textured patterns have a depth D. The pattern can have depressions of different depths, but almost all should be between 2 to about 15 mils, preferably about 2 to about 10 mils, more preferably about 3 to about 7 mils and most preferably about 4 to about 5 mils.

As illustrated in FIG. 3A, the depression of the textured patterns may have a regular shape and a substantially smooth bottom. However, as illustrated in FIG. 3B, the depressions of the textured patterns may also have an irregular shape with an uneven bottom so as to provide additional surface area for interfacial bonding with the layer that is subsequently applied.

The depressions which form the patterns may all be substantially the same width or may comprise a variety of different widths.

As used herein, "depression density" refers to the percentage (%) of the surface area of the mold cavity's interior surface which is covered by the depressions of the textured pattern. For optimal results, it is preferred that the depression density be about 45 percent to about 75 percent, more preferably about 50 percent to about 70 percent and most preferably about 60 percent of the surface area of the interior surface of the mold cavity.

After the cavity has been adapted to contain a desired pattern, the core and/or intermediate layer forming material is introduced into the cavity using any known conventional molding methods such as injection or compression molding. The resulting construction (i.e., the core or a core with an intermediate layer molded thereon) contains a textured surface profile integrally molded on its outermost surface which is a "negative image" of the pattern on the interior surface of the mold. This surface profile comprises a plurality of peaks having a height of about 2 to 15 mils and a peak density of about 45 to about 75 percent. The construction is then removed from the mold and may proceed directly to the next manufacturing step without a need for any other surface preparation steps such as grinding, washing or drying.

A particularly preferred pattern is one commercially available from Mold-Tech (division of Roehlen Industries) as Pattern No. 11050, which comprises a random pattern of non-uniform depressions having a depth of about 4 to 5 mils, a depression density of about 60 percent and a draft angle of about 5 to 6 degrees.

The presently claimed method may be employed to improve the interfacial adhesion between any of the abutting layers of a golf ball construction. As such, the present method can be used to form conventional two-piece golf balls or multilayer golf balls comprising a cover, a core and at least one intermediate layer disposed between the cover and the core.

For example, a two-piece golf ball having a cover and a core may be formed by compression molding and casting processes, wherein the core blend is introduced into a mold cavity having an interior surface that has been adapted to contain a textured pattern comprising a plurality of depressions having a depth of about 2 to 15 mils and a draft angle of less than about 10 degrees. A core is formed having a corresponding textured surface profile comprising a plurality of peaks having a height of about 2 to 15 mils integrally formed in the outer surface thereof. The core is removed from the textured mold cavity and subsequently a multilayer cover is applied around the textured core as described in greater detail below. The textured surface profile of the core promotes adhesion between the core and the cover.

Further, a multilayer golf ball may also be formed by the present claimed method. The outer surface of one of the layers of the multilayer construction may have a textured surface profile comprising a plurality of peaks having heights of about 2 to 15 mils integrally molded therein. Each of the outer surfaces of the layers may have the same surface profile or different surface profiles. Alternatively, only selected layers of the construction may have a textured surface profile integrally molded therein.

In a non-limiting example, a golf ball core may be molded using a compression molding method or may be wound elastomer around a liquid or solid center. The core is then placed in a mold cavity which contains a textured pattern on the interior surface of the cavity. An intermediate layer blend is subsequently injection molded about the core in the mold cavity to form an intermediate layer wherein the outer surface of the intermediate layer contains a textured surface profile integrally molded therein. After forming the intermediate layer(s), a cover is cast around this construction, as described more fully below.

Alternatively, the cavity for forming the core may comprise a textured pattern on the interior surface thereof so as to form a core having a corresponding textured surface profile. The textured core is then placed in a second mold cavity which also has a textured interior surface. An intermediate material blend is then introduced to the second cavity to form a construction having an intermediate layer with a textured surface profile on the outer surface thereof. Subsequently, a cover is cast around this construction, as described more fully below.

Without being limited to any particular theory, it is believed that with low club head speed and high loft shots such as those made with an 8-iron or a wedge, a ball's surface hardness has a greater influence on the ball's flight characteristics than the ball's overall construction. Thus, all other parameters being equal, a ball with a softer surface will have a higher spin rate than one with a harder surface.

Conversely, however, when a golf ball is struck with a high club head speed and a low loft angle, such as that of a driver, it appears that the overall construction of the ball has a greater influence on the ball's flight characteristics than its surface hardness.

Accordingly, by the present invention, it has been found that by creating a golf ball with a low spin construction, but adding a very thin layer of a relatively soft thermoset material formed from a castable reactive liquid, a golf ball with "progressive performance" from driver to wedge can be formed. As used herein, the term "thermoset" material refers to an irreversible, solid polymer that is the product of the reaction of two or more prepolymer precursor materials.

The use of a multilayer cover allows the ball to have a "progressive performance" when struck with a variety of clubs. The thickness of the outer cover layer is critical to the "progressive performance" of the golf balls of the present invention. If the outer cover layer is too thick, this cover layer will contribute to the in-flight characteristics related to the overall construction of the ball and not the cover surface properties. However, if the outer cover layer is too thin, it will not be durable enough to withstand repeated impacts by the golfer's clubs. Specifically, it has been determined that the outer cover layer must have a thickness of less than about 0.05 inches, preferably between about 0.02 and about 0.04 inches. Most preferably, this thickness is about 0.03 inches.

The outer cover layer is formed from a relatively soft thermoset material in order to replicate the soft feel and high spin play characteristics of a balata ball when the balls of the present invention are used for pitching and other "short game" shots. In particular, the outer cover layer should have a Shore D hardness of from about 30 to about 60. In a very soft embodiment, the cover has a Shore D hardness of 35–50 and most preferably 40–45. In another embodiment, the cover has a hardness of between 50 and 60 Shore D. Additionally, the materials of the outer cover layer must have a degree of abrasion resistance in order to be suitable for use as a golf ball cover.

The outer cover layer of the present invention can comprise any suitable thermoset material which is formed from a castable reactive liquid material. The preferred materials for the outer cover layer include, but are not limited to, castable urethanes and polyurethanes, thermoset urethane ionomers and thermoset urethane epoxies. Examples of suitable polyurethane ionomers are disclosed in co-pending U.S. patent application Ser. No. 08/482,519, filed Jun. 7, 1995, entitled "Golf Ball Covers", the disclosure of which is hereby incorporated by reference in its entirety in the present application.

Thermoset polyurethanes and urethanes are particularly preferred for the outer cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxypropyl)ethylenediamine. However, the present invention is not limited to just these specific types of thermoset polyurethanes. Quite to the contrary, any suitable castable polyurethane may be employed to form the outer cover layer of the present invention.

In a preferred embodiment, the inner cover layer of the present invention is formed from a hard, high flexural modulus, resilient material which contributes to the low spin, distance characteristics of the presently claimed balls when they are struck for long shots (e.g. driver or long irons). Specifically, the inner cover layer materials have a Shore D hardness of about 65–80, preferably about 69–74 and most preferably about 70–72. Furthermore, as defined herein, the term "high flexural modulus" means a flexural modulus (as measured by ASTM 790) of at least about 65,000 psi, preferably about 70,000 psi to about 120,000 psi and most preferably at least about 75,000 psi. The thickness of the inner cover layer can range from about 0.020 inches to about 0.045 inches, preferably about 0.030 inches to about 0.040 inches and most preferably about 0.035 inches.

In another embodiment, the inner cover layer materials have a Shore D hardness of about 62–70, preferably about 65–68. In this embodiment, the flexural modulus of the material may be at least about 50,000 psi, preferably about 55,000 psi to about 70,000 psi and most preferably about 60,000 psi to about 65,000 psi. The thickness of the inner cover layer can range from about 0.020 inches to about 0.045 inches, preferably about 0.030 inches to about 0.040 inches and most preferably about 0.035 inches.

The inner cover layer may be formed from a wide variety of resilient materials. Among the preferred inner cover materials are hard, high flexural modulus ionomer resins and blends thereof. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes copolymers of ethylene and acrylic or methacrylic acid present in 5–35 (preferably at least about 15, more preferably at least about 15–35, most preferably at least about 16–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g., U.S. Pat. No. 3,262, 272. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li) which have an methacrylic acid content of about 19%.

However, the materials for the inner cover layer are not limited to ionomer resins. Instead, the present invention contemplates that virtually any highly resilient material which is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrene-butadiene elastomer, a metallocene polymer or blends thereof.

Suitable thermoplastic polyetheresters include materials which are commercially available from DuPont under the tradename Hytrel®. Suitable thermoplastic polyetheramides include materials which are available from Elf-Atochem under the tradename Pebax®. Other suitable materials for the inner cover layer include nylon and acrylonitrile-butadiene-styrene copolymer (ABS).

The golf ball cores of the present invention may comprise any of a variety of constructions. For example, the core of the golf ball may comprise a conventional center surrounded by an intermediate layer disposed between the center and the cover layer. The core may be a single layer or may comprise a plurality of layers. The innermost portion of the core may be solid or it may be a liquid filled sphere. As with the core, the intermediate layer may also comprises a plurality of layers. The core may also comprise a solid or liquid filled center around which many yards of a stretched elastic thread or yarn are wound.

The materials for solid cores include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel.

The initiator agent can be any known polymerization initiator which decomposes during the cure cycle. Suitable initiators include peroxide compounds such as dicumyl peroxide, 1,1-di(t-butylperoxy)3,3,5-trimethyl cyclohexane, a-a bis (t-butylperoxy) diisopropylbenzene, 2,5-dimethyl-2,5di(t-butylperoxy)hexane or di-t-butyl peroxide and mixtures thereof.

Conventional prior art golf balls typically incorporate 5 to 50 pph of zinc oxide in a diacrylate-peroxide core system. However, the zinc oxide may be replaced by calcium oxide in a diacrylate-peroxide system to provide a suitable core composition.

As used herein, the term "filler" includes any compound or composition that can be used to vary the density and other properties of the core. Fillers typically include materials such as zinc oxide, barium sulfate, silica, calcium carbonate, zinc carbonate, regrind (recycled core material ground to 30 mesh size) and the like.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere made from a thermoplastic or thermoset material into which a liquid such as corn syrup and water is injected by means of a needle. The sphere is then sealed. Typically, the core is frozen to make it a solid mass prior to winding. The windings for either type of center are provided by an elastic thread which is stretched and wound about the core to a desired thickness.

The overall outer diameter (OD) of the core (including the center and any mantle layer(s) or windings) together with the inner cover layer of the golf balls of the present invention is about 1.58 inches to about 1.64 inches, preferably about 1.60 inches to about 1.63 inches, and most preferably about 1.62 inches.

The present multilayer golf ball can have an overall diameter of any size. Although the United States Golf Association (USGA) specifications limit the minimum size of a competition golf ball to more than 1.68 inches in diameter, there is no specification as to the maximum diameter. Moreover, golf balls of any size can be used for recreational play. The preferred diameter of the present golf balls is from about 1.680 inches to about 1.80 inches. The more preferred diameter is from about 1.68 inches to about 1.72 inches. The most preferred diameter is about 1.68 inches to about 1.69 inches.

The cores and inner cover of the golf balls of the present invention can be made by any conventional process employed in the golf ball art. For example, the solid centers can be either injection or compression molded. Similarly, the wound centers employed in the present invention can be produced through conventional means. The inner cover layer and any mantle layer(s) are subsequently injection or compression molded about the core.

However, due to the very thin nature (less than 0.05"), it is not practical to form the outer cover layers of the ball of the present invention using conventional injection or compression molding techniques ordinarily employed in the golf ball art for applying cover materials. These conventional ball molding processes are not capable of uniformly applying such thin outer cover layers over a solid spherical surface.

Accordingly, it has been found by the present invention that the use of a castable, reactive liquid material which is applied in a fluid form makes it possible to obtain very thin outer cover layers on golf balls. Specifically, it has been found that castable, reactive liquids which react to form a thermoset material provide desirable very thin outer cover layers.

The castable, reactive liquid material employed to form the thermoset material can be applied over the core or inner cover layer using a variety of application techniques which are well known in the art. An example of a suitable casting technique is that which is disclosed in U.S. Pat. No. 5,733,428, filed May 2, 1995 entitled "Method And Apparatus For Forming Polyurethane Cover On A Golf Ball", the disclosure of which is hereby incorporated by reference in its entirety in the present application.

Figure 4:
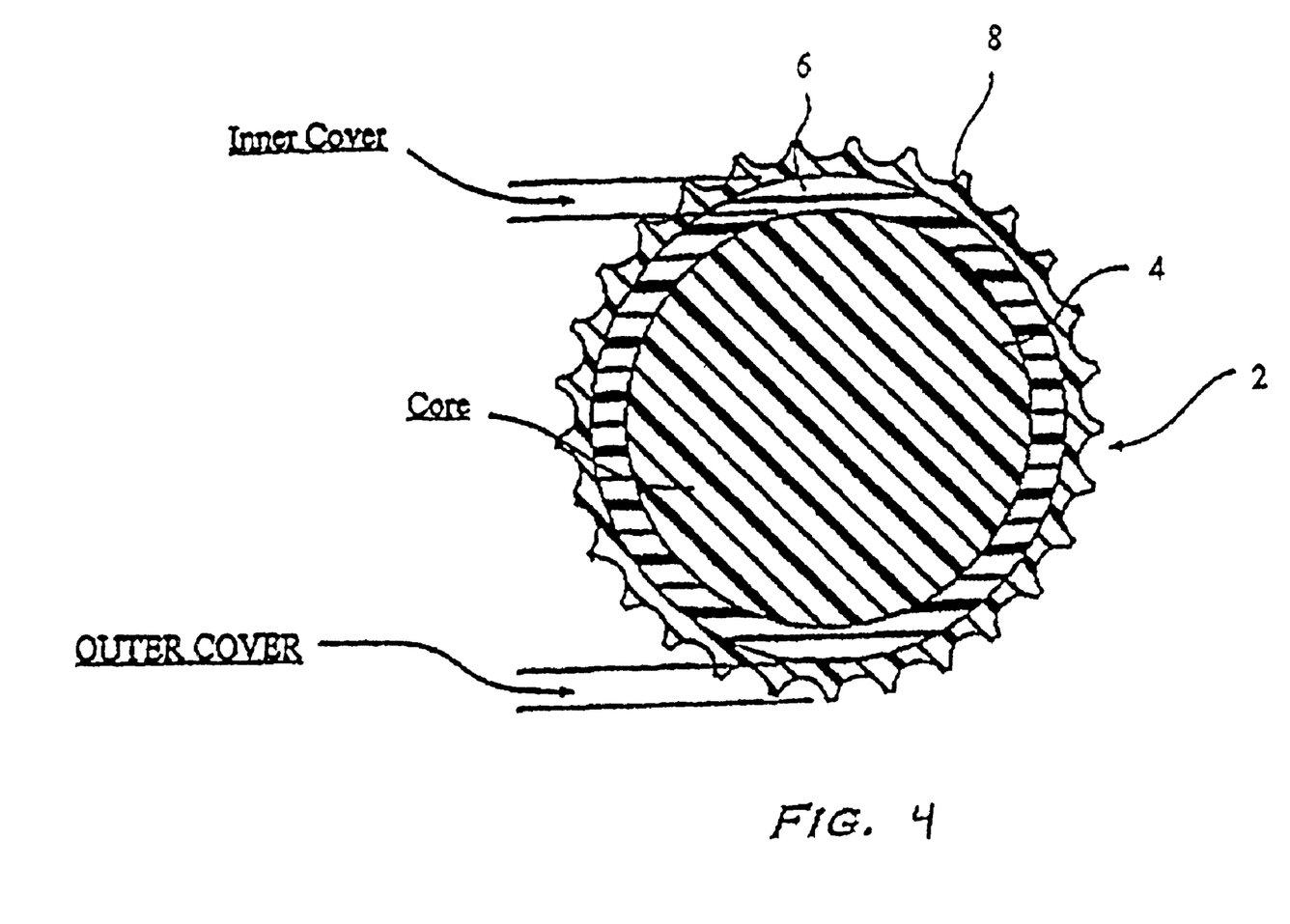
FIG. 4 is a cross-section of a golf ball 2 having a core 4, an inner cover layer 6 and an outer cover layer 8.
Figure 5:
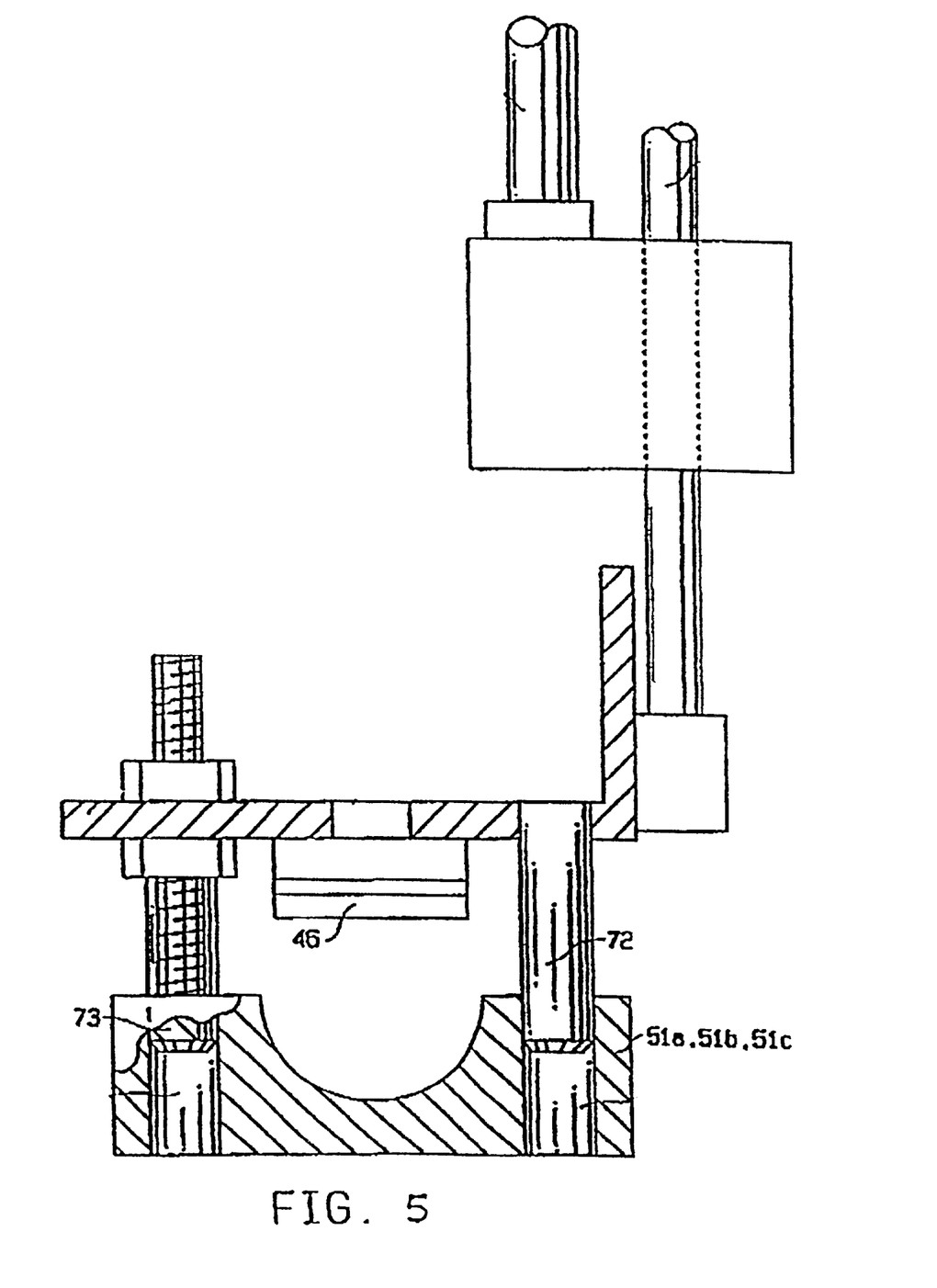
FIG. 5 is a partial side elevational view of a cover casting device.
Figure 6:
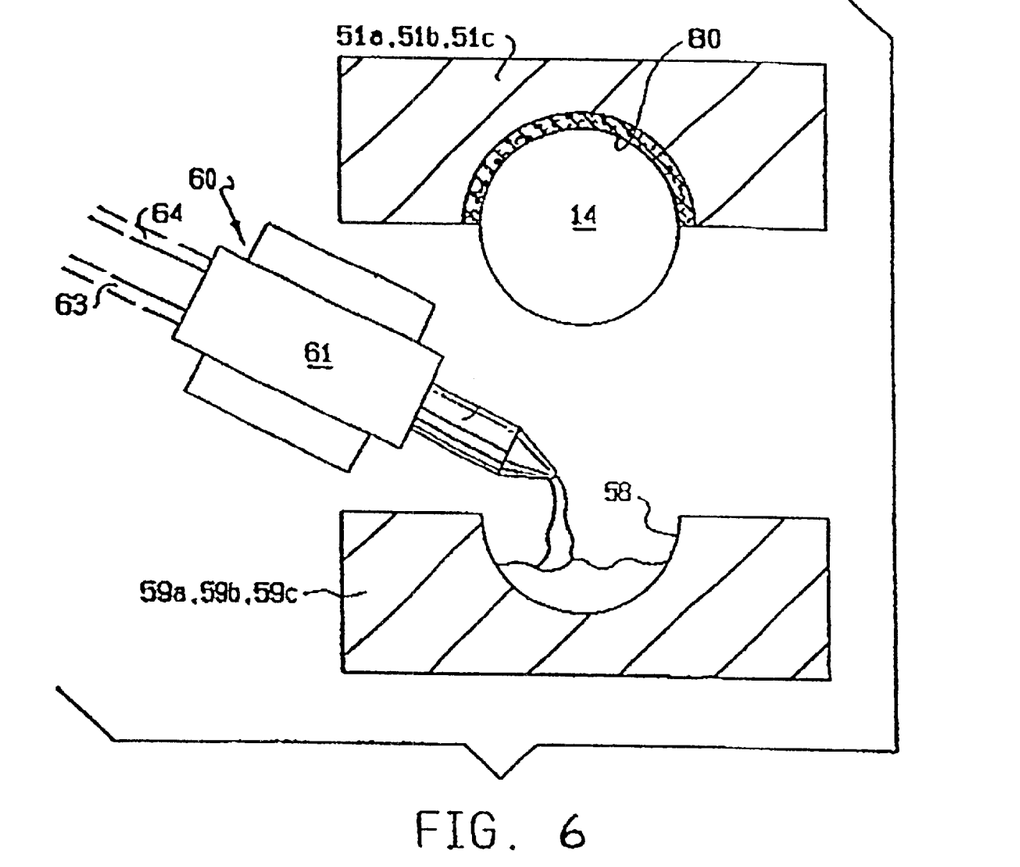
FIG. 6 shows an apparatus for mixing and dispensing polyurethane and shows one mold half being inverted before mating with a second mold half.

As shown in FIGS. 4 and 6, the cover 8 is formed around the core 4 and intermediate layer 6 by mixing and introducing a castable reactive liquid material in mold halves 51*a, b,*

Figure 7:
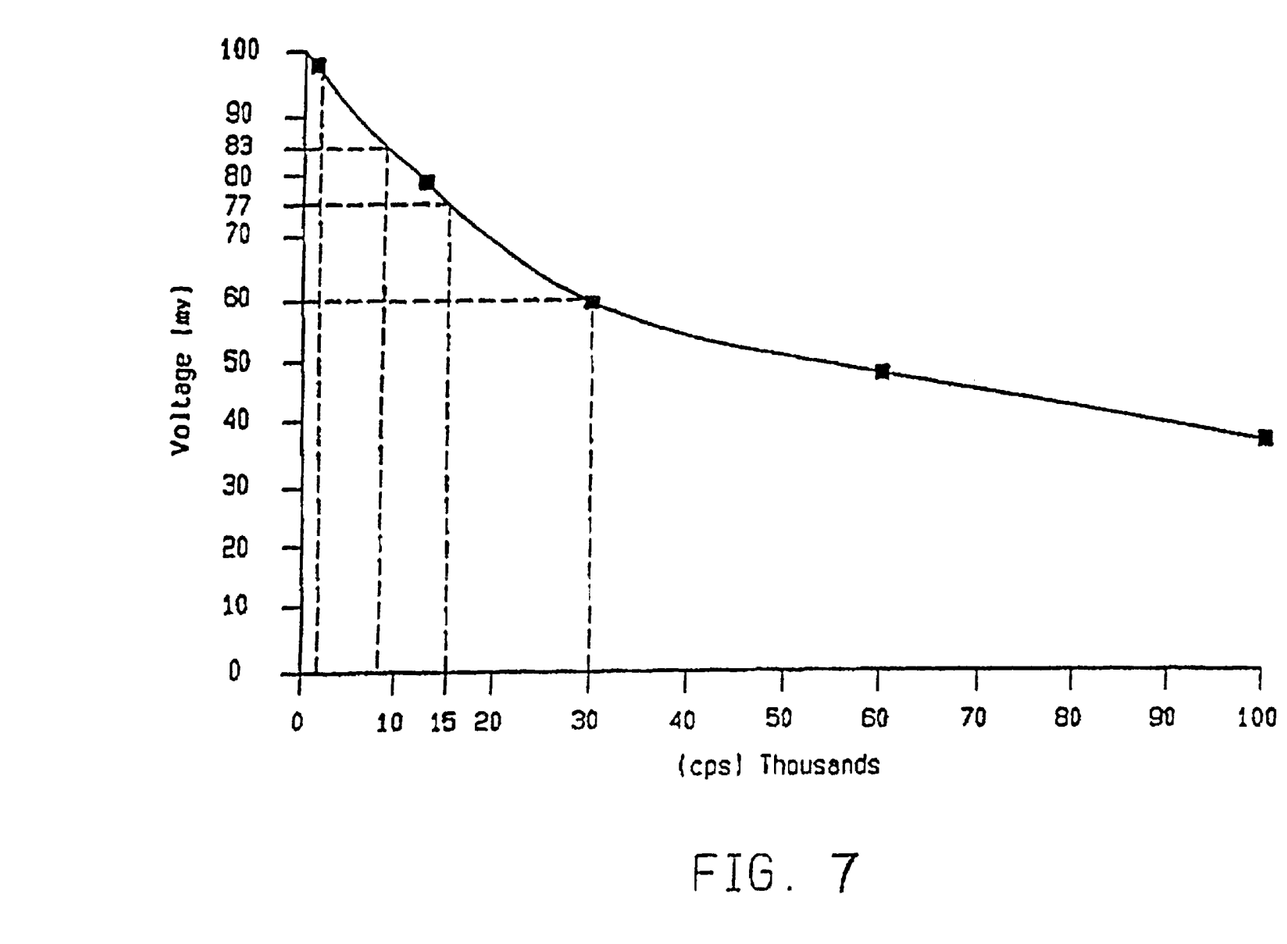
FIG. 7 is a graph plotting voltage vs. cps for suitable viscosities of curing urethane.

*c* and 59*a, b, c*. Once mixed, an exothermic reaction commences and continues. It is important that the viscosity be measured over time, so that the subsequent steps of filling each mold half, introducing the core and intermediate layer into one half and closing the mold can be properly timed for accomplishing centering of the cover halves and achieving uniform cover thickness. Suitable viscosity range of the curing urethane mix for introducing cores and intermediate layers 14 into the mold halves is determined to be approximately between 2,000 cps to 30,000 cps or between 60 mv to 98 mv voltage output on a vibrating needle cure meter with the preferred range of 8,000 to 15,000 cps (see FIG. 7). The time (gel time) at which the desired viscosity range occurs for mold mating is measured from first introduction of the mix into the top half mold 51*a, b, c*.

The cover material used in the present method is castable polyurethane which is the product of a reaction between a polyurethane prepolymer and a curing agent. To start the cover formation, mixing of the prepolymer and curative is accomplished in motorized mixer including mixing head 61 by feeding through lines 63 and 64 metered amounts of curative and prepolymer. Top preheated mold halves 51*a, b, c* are filled and placed in fixture unit using pins 72 and 73 moving into holes in each mold. After the reacting materials have resided in top mold halves 51 *a, b, c* for about 50–80 seconds, a core and intermediate layer 14 is lowered at a controlled speed into the gelling reacting mixture. At a later time a bottom mold half 59*a, b, c* or a series of bottom mold halves has similar mixture amounts introduced into its cavity 58.

Ball cup 46 holds ball core and intermediate layer 14 through reduced pressure (or partial vacuum) in hose (not shown). Upon location of the core and intermediate layer 14 in halves of the mold 51*a, b, c* after gelling for 50–80 seconds, the vacuum is released allowing core and intermediate layer 14 to be released. Mold halves 51*a, b, c* with core and intermediate layer 14 and solidified cover half 80 thereon is removed from the centering fixture unit, inverted (see FIG. 6) and mated with other mold halves 59*a, b, c* which, at an appropriate time earlier have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable techniques which may be utilized to apply the castable reactive liquids employed in the present invention. The disclosures of these patents are hereby incorporated by reference in their entirety. However, the method of the invention is not limited to the use of these techniques.

The following example of multilayer golf balls formed according to the present invention is given to illustrate the present invention. However, it is to be understood that the example is for illustrative purposes only and in no manner is the present invention limited to the specific disclosures therein.

EXAMPLE

The following example is provided for the purpose of illustration only. The example should not be construed as limiting the present invention in any way as variations of the invention are possible which do not depart from the spirit and scope of the invention.

A golf ball of the present invention is formed comprising a cover, a core and an intermediate layer interposed between the cover and the core, wherein the intermediate layer has a textured pattern integrally formed in its outer surface. A solid core formed by molding a core blend composition using conventional compression molding techniques. Alternatively, the core may be made using either a conventional wound core construction or a conventional two-piece core construction formed using methods well known in the art. The wound core construction can be either a solid rubber-based center or a liquid filled center around which a length of elastic thread is wound.

A conventional solid core construction preferably comprises a cis 1,4 polybutadiene rubber that has been crosslinked with a metal salt of an unsaturated fatty acid such as zinc diacrylate.

The core blend composition in the present example is as follows:

| Ingredient | Parts Per Hundred |
| --- | --- |
| Polybutadiene Rubber | 100 |
| Pigment | 0.14 |
| Varox 231 | .42 |
| EF (DBDB) 60 | .16 |
| ZnO | 4.30 |
| Zinc Diacrylate | 25.81 |
| Polywate 325 | 13.15 |

The core is ground using a Glebar grinder to provide the proper outer diameter. The ground core is then washed, dried and placed in a retractable pin injection mold cavity which has had its internal surface modified to provide a textured pattern thereon. In particular, the internal surface of the mold cavity is modified to have a pattern commercially available from Mold-Tech (Division of Roehlen Industries) as Pattern No. 11050, which comprises a random pattern of non-uniform depressions having depths of about 4.5 mils, a draft angle of about 6.5 degrees and a depression density of about 60 percent.

The core is then covered using conventional injection or compression molding techniques to form an intermediate layer or inner cover layer of an ionomer preferably having a methacrylic acid content of about 15 to 16 weight percent or greater. The ionomer is preferably SURLYN 7940 (Lithium), SURLYN 8940 (Sodium), or blends thereof, most preferably a 50/50 blend.

The outer cover layer can be formed following the processes set forth in U.S. Pat. Nos. 5,006,297 and 5,334,673 and may be subjected to additional finishing processes to provide a finished ball. A particularly desired material for forming the outer cover layer is castable urethane with a hardness of about 40 to about 60 shore D, most preferably with a hardness of about 52 to about 60 shore D. The castable urethane preferably includes para-phenylene diisocyanate ("PPDI") as a starting material as set forth in U.S. patent application Ser. No. 09/311,591, which is hereby incorporated by reference.

In a most preferred combination of core, intermediate layer, and cover, the core has an outer diameter of approximately 1.55 inches or greater, the outer diameter of the intermediate layer is about 1.62 inches or greater, and the cover is about 0.04 inches thick or less.

It is believed that golf balls made in accordance with the present invention will improve adhesion between the golf ball layers. In addition, it is also believed that a ball having a thin cover layer cast over a harder intermediate layer will exhibit an appreciably lower spin rate when struck with a driver (and thus a greater overall distance) as compared to conventional "high performance" golf balls (e.g. Tour Balata

[Titleist]), but have very similar or even higher spin rates when struck with an 8 iron and/or a "50 yard" wedge, thereby evidencing a "progressive performance" from driver to wedge in the golf balls of the present invention.

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A method for forming a multilayer golf ball having improved interfacial adhesion, said method comprising:
   (a) forming a core;
   (b) forming an intermediate layer over the core, wherein the intermediate layer has an integrally molded textured outer surface, wherein said textured outer surface comprises a plurality of peaks having draft angles of less than about 10 degrees and heights of between about 2 to about 15 mils.
   (c) casting a cover layer over the intermediate layer with a castable liquid reactive material or reaction products thereof.

2. The method of claim 1, wherein the peaks of the textured outer surface have a draft angle from about 4 degrees to about 8 degrees.

3. The method of claim 1, wherein the peaks of the textured outer surface have heights of about 3 to about 7 mils.

4. The method of claim 1, wherein the textured outer surface has a peak density of about 45 percent to about 75 percent.

5. The method of claim 1, wherein the textured outer surface comprises a random pattern of peaks having an irregular shape.

6. The method of claim 1 wherein the textured outer surface comprises a repeating pattern of peaks having a regular shape.

7. The method of claim 1, wherein the step of forming the core further comprises a second integrally molded textured outer surface, wherein said second textured outer surface comprises a plurality of peaks having heights of between about 2 to about 15 mils.

8. The method of claim 7, wherein the first and second textured outer surfaces are comprised of substantially the same pattern.

9. The method of claim 7, wherein the peaks of the second textured outer surface have a draft angle from about 4 degrees to about 8 degrees.

10. The method of claim 7, the first and second textured outer surfaces have heights of about 3 to about 7 mils.

11. The method of claim 7, wherein the first and second textured outer surfaces have peak densities of about 45 to about 75 percent.

12. The method of claim 7, wherein said second textured outer surface comprises a random pattern of peaks having an irregular shape.

13. The method of claim 7, wherein said second patterns comprises a repeating pattern of depressions having a regular shape.

14. A method of forming a multilayer golf ball comprising a cover, a core and at least one intermediate layer interposed between said cover and core, said multilayer ball having improved interfacial adhesion between its layers, wherein the method comprises:
   (a) forming a golf ball core;
   (b) forming a textured pattern on the interior surface of a mold cavity, wherein said pattern comprises a plurality of depressions having depths of about 2 to about 15 mils and draft angles less than about 10 degrees;
   (c) placing the core in said mold cavity;
   (d) forming an intermediate layer having a first shore D hardness on said core in said mold cavity, said intermediate layer having a textured surface profile integrally molded in the outer surface thereof, wherein said surface profile is a corresponding image of said pattern and comprises a plurality of peaks having heights of about 2 to about 15 mils; and
   (e) casting an outer cover layer with a castable liquid reactive material or reaction products thereof having a second shore D hardness less than the first shore D hardness and a thickness of less than 0.05 inches.

15. A golf ball having improved interfacial adhesion comprising a cover, a core and at least one intermediate layer therebetween, wherein said intermediate layer has a textured surface profile integrally molded in an outermost surface thereof, wherein said textured surface profile comprises a plurality of peaks extending from said outermost surface, said peaks having heights of about 3 to about 7 mils.

16. The golf ball of claim 15 wherein said textured surface profile has a peak density of about 45 to about 75 percent.

17. The golf ball of claim 15 wherein the cover is formed from a castable liquid reactive material or reaction products thereof.

18. The golf ball of claim 15 wherein the plurality of peaks have draft angles of about 4 degrees to about 8 degrees.

19. The golf ball of claim 15 wherein the cover has a lower shore D hardness than the intermediate layer.

20. A golf ball having improved interfacial adhesion comprising a cover, a core and at least one intermediate layer therebetween, wherein said intermediate layer has a textured surface profile integrally molded in an outermost surface thereof, wherein said textured surface profile comprises a plurality of peaks extending from said outermost surface, said peaks having a draft angle less than about 10 degrees.

21. The golf ball of claim 20 wherein the cover is formed from a castable liquid reactive material.

22. The golf ball of claim 20 wherein said textured surface profile has a peak density of about 45 to about 75 percent.

23. The golf ball of claim 20 wherein the plurality of peaks have heights from about 2 to about 15 mils.

* * * * *